Patented Oct. 17, 1933

1,931,285

UNITED STATES PATENT OFFICE 1,931,285

PROCESS OF TREATING DROSSES

Frank F. Colcord, New York, N. Y., and John J. Mulligan, East Chicago, Ind., assignors to United States Smelting, Refining & Mining Company, Portland, Maine, a corporation of Maine No Drawing. Application October 7, 1930
Serial No. 487,024

7 Claims. (Cl. 75—17)

This invention relates to metal drosses and more particularly to a new and improved method of treating the same for the purpose of liberating the metal held entrained or in suspension therein.

When a metal, and particularly a readily fusible metal such as lead, zinc, tin, bismuth, or cadmium or any of their alloys, is liquefied by heat, a scum is formed upon the surface of the molten metal. This scum or dross, as it is commonly termed, usually consists of the oxides and other compounds of the metal, together with the insoluble impurities and various other substances in the molten metal and a quantity of the metal or alloy held in suspension or entrained in the mass in the form of small, more or less separated particles.

The word "metal" or "metals" is understood to mean not only a single metal but any combination of metals together with the impurities or other substances which may be contained therein.

The amount of dross formed varies with the different metals and the conditions, sometimes reaching 35 or even 40 per cent. by weight of the metal itself. The quantity of entrained metal in the dross also varies but is of substantial amount and may and frequently does exceed in weight the oxides, insoluble impurities and other substances present.

While heretofore various means have been used to release the entrained metal from dross, such as blowing the molten metal with air or submerging green wooden poles in the molten bath to cause some of the molten metal to be thrown above the surface and in falling down on the drosses to wash out some of the entrained metal, the dross still retains substantial amounts of entrained metal. The dross is separated from the molten metal, ordinarily by skimming it from the surface of the molten metal, and it is subsequently treated by pressing or liquating, to recover as much as possible of the entrained metal.

It is the object of the present invention to provide a method or process for the treatment of such drosses, preferably at the time of their formation and before their removal from the molten metal whereby the amount of dross will be greatly reduced and the entrained metal separated therefrom, so that further or additional treatment for the recovery from the dross of entrained metal will be unnecessary. If desired, however, the dross may be removed from the molten metal and allowed to solidify and at a subsequent time returned to the molten bath and treated in the same manner as if it had not been removed.

While the novel features characterizing this invention will be indicated in the claims appended to this specification, the invention itself, its object and advantages, and the method of its application and operation can better be understood from the following description wherein a particular commercial embodiment of the invention is disclosed. It is to be understood, however, that the processes and the steps thereof may be modified in various aspects without departing from the broad spirit and scope of the invention. In the following description and in the appended claims, the specific terms used to characterize the various steps in the process and the details comprising the invention are intended to be as generic in their applications as the art permits.

The process in accordance with the present invention can be carried out by heating metals in general or a readily fusible metal in particular, such as lead, zinc, tin, bismuth or cadmium or any of their alloys to a temperature sufficiently high for a length of time sufficiently great to produce complete liquefaction during which heating a scum or dross is formed upon the surface of the molten metal. This scum or dross is then brought into intimate contact with the molten metal by agitation or stirring of the same into the molten metal lying beneath it, so that at all times the metal held in suspension or entrained in the dross is maintained in the molten state and is not permitted through loss of heat to solidify. In the cases of easily oxidizable metals, such as lead and its alloys, carbonaceous or hydrocarbonaceous substances may be added to the materials being treated during the mixing of the metal and its scum, or other reagents or fluxes may be added during the stirring period. After a lapse of time the length of which is determined by such factors as the composition of the molten metal, the temperature of the fused metal, and the character of the agitation, a fairly rapid transformation in the character and appearance of the dross occurs. The dross which heretofore was metallic in appearance and more or less wet and "mushy", loses its luster and appears to disintegrate into a dry and powdery material whose color may differ from, and is generally darker than that of the original dross. This powdery material gathers into patches upon the surface of the molten metal, showing little tendency to spread. After the conclusion of the agitation or stirring, the completion of which is indicated by the substantially complete disappearance of the original wet, mushy scum and its conversion into the loose, dry, powdery material, the powdery material is skimmed from the surface of the metal. This powdery material has very little entrained metal and its weight is substantially less than the weight of the dross first formed.

As a specific example of the application of the invention to the purification of antimonial lead, the metal preferably as molten metal, is supplied to an open kettle until it is say, three-quarters filled. Its temperature is brought preferably to about 850° F. to 900° F. and the stirring or agitation is begun. Molten metal is added from time to time until the kettle is full. A convenient form of apparatus to effect the stirring or mixing is the well-known Howard stirrer, and its action may be supplemented or assisted by the use of paddles or other manual implements. The agitation is continued for some time, with no apparent change occurring in the appearance and character of the scum. After this period of induction, the length of which is determined by such factors as the composition of the metal, its temperature, and the thoroughness of the mixing process, a change takes place in the appearance of the dross; black spots first appear and the dross then rapidly loses it wet or mushy character. Its metallic lustre disappears and it is converted fairly rapidly into surface patches of non-lustrous, brown, dry, powdery material. The stirring or agitation is continued after the comparatively rapid transformation until no further appreciable changes occur. After the conclusion of the agitation, the dry, powdery material is skimmed from the surface of the metal. Examination of the skim discloses the fact that it is a dross containing comparatively little metal in the metallic state.

The temperature at which the process is carried out will vary with the different metals and alloys. It may be from just above the melting point to a comparatively high temperature. The proper temperature may easily be determined; if too low the entrained metal is not readily released; if too high there will be excessive oxidation of the dross and metal.

The time required by the process also will depend on the amount of dross and the character of the material being treated. A relatively short time, say, a quarter of an hour might suffice in one case, while two hours or longer might be needed in another.

The characteristic changes in the dross from its original wet or mushy appearance with metallic lustre, to the dull, dry, powdery material, indicate to the operator the working of the process.

Having thus described the invention, what is claimed is:

1. The process of treating lead, zinc, tin, bismuth and cadmium and their alloys which consists in melting completely the said metals, whereby drosses are formed thereon, and thereafter in subjecting the said drosses to prolonged agitation with the molten metals in the absence of refining agents until dry drosses of low entrained metal content are produced.

2. The process of treating lead, zinc, tin, bismuth and cadmium and their alloys which consists in melting completely the said metals whereby drosses consisting of materials insoluble in said metals holding quantities of said metals in suspension are formed thereon, and thereafter in intimately mixing the said drosses with the molten metals in the absence of refining agents to cause the materials insoluble in said metal to form dry, powdery drosses of low entrained metal content.

3. The process of treating lead bearing alloys which consists in melting completely the said alloys whereby drosses are formed thereon, and thereafter subjecting the drosses to a prolonged mixing with the molten metals until dry, powdery drosses of low entrained metal content are produced.

4. The process of treating the drosses of lead, lead bullion, and lead alloys which consists in subjecting the drosses to prolonged agitation with molten metal, until the said drosses release the metal entrained therewith and become dry and of low entrained metal content.

5. The process of treating lead, zinc, tin, bismuth and cadmium and their alloys which consists in melting completely the said metals whereby drosses are formed thereon, adding a refining agent, stirring to mix intimately the refining agents with the molten metal, and continuing the stirring vigorously thereafter to cause the insoluble materials to form dry powdery drosses of low entrained metal content.

6. The process of treating metals which consists in melting completely the said metals in the presence of a refining agent, subjecting the molten metals and the refining agent to thorough mixing to form drosses, and prolonging the mixing vigorously thereafter until the drosses release the metal entrained therewith and become dry and of low entrained metal content.

7. The process of treating metals which consists in melting completely and maintaining in a molten condition the said metals whereby wet mushy drosses are formed thereon, and thereafter subjecting such drosses to vigorous and prolonged churning with the molten metals to transform said wet mushy drosses to dry powdery drosses.

FRANK F. COLCORD.
JOHN J. MULLIGAN.